United States Patent [19]

Sakamoto et al.

[11] Patent Number: 5,229,446
[45] Date of Patent: Jul. 20, 1993

[54] POLYSTYRENE RESIN COMPOSITION HAVING IMPROVED STIFFNESS

[75] Inventors: Masashi Sakamoto; Akifumi Tohara; Kiyoshi Koutou, all of Yokohama, Japan

[73] Assignee: Asahi Kasei Kogyo Kabushiki Kaisha, Osaka, Japan

[21] Appl. No.: 990,933

[22] Filed: Dec. 14, 1992

Related U.S. Application Data

[63] Continuation of Ser. No. 673,249, Mar. 20, 1992, abandoned, which is a continuation of Ser. No. 294,071, Jan. 6, 1989, abandoned.

[30] Foreign Application Priority Data

Jul. 28, 1988 [JP] Japan ............................. 63-186766

[51] Int. Cl.$^5$ .................... C08K 13/04; C08K 5/09; C08K 7/02; C08K 3/10
[52] U.S. Cl. .................... 524/322; 524/394; 524/399; 524/400; 524/413; 524/496
[58] Field of Search ............... 524/322, 394, 399, 400, 524/413, 496

[56] References Cited

U.S. PATENT DOCUMENTS

| | | | |
|---|---|---|---|
| 3,796,772 | 3/1974 | Luce | 524/413 |
| 3,856,887 | 12/1974 | Luce | 524/413 |
| 4,009,043 | 2/1977 | Preis | 524/413 |
| 4,483,958 | 11/1984 | Kosaka | 524/413 |
| 4,493,913 | 1/1985 | Hirobe et al. | 523/216 |
| 4,499,228 | 2/1985 | Ogawa | 524/413 |
| 4,692,480 | 9/1987 | Takahashi et al. | 523/218 |
| 5,013,773 | 5/1991 | Nomura et al. | 524/423 |

OTHER PUBLICATIONS

Kogyo Zairyo (Industrial Materials), vol. 28, No. 8, pp. 85–97 (1980).
Kogyo Zairyo (Industrial Materials), vol. 29, No. 5, pp. 44–49 (1981).
Osaka-furitsu Kogyo Gijutsu Kenkyusho Hokoku (Report of Osaka Prefectural Technology Research Laboratories, Japan), No. 77, pp. 49–54 (1980).
Polymer Engineering and Science, vol. 13, No. 6, pp. 409–414 (1973).

*Primary Examiner*—Paul R. Michl
*Assistant Examiner*—Peter Szekely
*Attorney, Agent, or Firm*—Armstrong, Westerman, Hattori, McLeland & Naughton

[57] ABSTRACT

A polystyrene resin composition comprising a rubber-reinforced polystyrene, a fibrous potassium titanate and a higher fatty acid and/or its metal salt in specific proportions. The composition exhibits greatly improved stiffness without sacrificing its excellent impact strength, melt flowability and good appearance. The composition is useful as a material for manufacturing large-sized molded articles, such as parts and housings for large-sized TV sets and frames for air conditioners. The composition may further comprise a fire retardant and a carbon fiber in specific proportions. The resultant fire-retardant composition is not only excellent in the above-mentioned properties of mechanical strength but also exhibits excellent fire retardance and, therefore, is advantageously used as a material for manufacturing the above-mentioned articles especially when the articles are required to have high fire retardance.

17 Claims, No Drawings

POLYSTYRENE RESIN COMPOSITION HAVING IMPROVED STIFFNESS

This application is a continuation of application Ser. No. 07/673,249 filed Mar. 20, 1992 now abandoned which is a continuation of application Ser. No. 07/294,071 filed Jan. 6, 1989, abandoned.

BACKGROUND OF THE INVENTION

1. Field Of The Invention

The present invention relates to a polystyrene resin composition having improved stiffness. More particularly, the present invention is concerned with a polystyrene resin composition comprising a rubber-reinforced polystyrene resin, a fibrous potassium titanate and a higher fatty acid and/or its metal salt in specific proportions, which composition has not only excellent appearance and impact strength but also extremely improved stiffness. The polystyrene resin composition may include a specific amount of a flame retardant in combination with a specific amount of a carbon fiber so that the polystyrene resin composition is remarkably improved in flame retardance without sacrificing the appearance, stiffness, impact strength and melt flowability of the composition. The polystyrene resin composition can be advantageously used as a material for manufacturing parts and housings of appliances, cabinets of large televisions, and the like.

2. Discussion Of Related Art

Polystyrene resins are used in a wide variety of fields. For example, they are used as materials for preparing parts and housings of appliances, and various vessels and articles for daily life, because the polystyrene resins have both good physical properties and good moldability. However, when polystyrene resins are used as materials for large parts or large articles, e.g., cabinets for large televisions and frames for air conditioners, there are problems arising from insufficient stiffness of the polystyrene resins.

It is well known in the art that the stiffness of a polystyrene resin can be improved by incorporating a glass fiber thereinto. However, incorporation of a glass fiber causes the polystyrene resin to have poor appearance and impact strength. Accordingly, various attempts have been made to improve the stiffness of a polystyrene resin without causing other problems. For example, it was attempted to incorporate a fibrous potassium titanate into a polystyrene resin such as a rubber-reinforced polystyrene resin, which is a typical example of a high impact polystyrene (HIPS), and a rubber-reinforced styrene-acrylonitrile copolymer, e.g., an acrylonitrile-butadiene-styrene (ABS) resin [see *Kogyo Zairyo* (Industrial Materials), vol. 28, No. 8, pages 85–97 (1980); *Kogyo Zairyo* (Industrial Materials), vol. 29, No. 5, pages 44–49 (1981); Osaka-furitsu Kogyo Gijutsu Kenkyusho Hokoku (Report of Osaka Prefectural Technology Research Laboratories, Japan), No. 77, pages 49–54 (1980); Polymer Engineering And Science, vol. 13, No. 6, pages 409–414 (1973); and Japanese Patent Application Laid -Open Specification No. 58-213032]. It has been reported that from the viewpoint of the smoothness and appearance of the ultimate molded article, incorporation of a fibrous potassium titanate into a polystyrene resin is preferred to incorporation of a glass fiber into a polystyrene resin. However, when a fibrous potassium titanate is incorporated into a polystyrene resin, although the stiffness, in terms of tensile strength and flexural modulus of elasticity, of the resin is remarkably improved, the impact strength of the resin is disadvantageously lowered. Therefore, the resultant polystyrene resin composition cannot be used as a material for preparing large molded articles which are required to have particularly high impact strength.

Moreover, it is often required that the polystyrene resins have not only excellent stiffness and impact strength but also improved flame retardance. In line with these requirements, various attempts have been made in the art. For example, it was attempted to impart high flame retardance to a polystyrene resin by incorporation of a flame retardant, such as an organ halogen compound and, at the same time, impart non-dripping properties to the resin by incorporation of an inorganic filler, such as asbestos (see, for example Japanese Patent Application Publication Specification No. 58-37333). In the specification, however, it is described that when the inorganic filler is incorporated into a polystyrene resin in an amount of more than 10 parts by weight per 100 parts by weight of the polystyrene resin, the flame retardance of the resultant polystyrene resin composition become unfavorably low, that is, the resultant polystyrene resin composition shows a long glowing (combustion with no flaming) duration when subjected to a flammability test in accordance with the test for flammability of plastic materials UL-94 (published by UNDERWRITERS LABORATORIES INC., U.S.A.). This means that in the above-mentioned polystyrene resin composition, the amount of an inorganic filler must be limited to a low level to ensure desirable flame retardance. With a low level of the amount of the inorganic filler, however, the stiffness improvement by incorporation of the inorganic filler is not sufficient. Therefore, the above attempt does not give a solution to the goal of providing a polystyrene resin composition having both excellent flame retardance and excellent stiffness.

As apparent from the above, a polystyrene resin composition having not only high impact strength and good appearance but also high stiffness has not yet been realized in the art. Further, a polystyrene resin composition having not only excellent mechanical strength properties but also high flame retardance has also not yet been realized.

SUMMARY OF THE INVENTION

The present inventors have made extensive and intensive investigations with a view toward developing a polystyrene resin composition which is greatly improved in stiffness without sacrificing the appearance and impact strength inherent in a rubber-reinforced resin. As a result, it has been found that such a desired polystyrene resin composition can be obtained by incorporating a fibrous potassium titanate together with a higher fatty acid or its metal salt in specific amounts into a rubber-reinforced polystyrene resin. It has also unexpectedly been found that when the above -mentioned polystyrene resin composition has a fibrous potassium titanate content exceeding a certain level, incorporation of a specific amount of a flame retardant in combination with a specific amount of a carbon fiber into the polystyrene resin composition is very effective for imparting excellent flame retardance as well as greatly improved stiffness to the resin composition without sacrificing the appearance, impact strength and melt flowability of the resin composition. The present invention has been completed based on these novel findings.

It is, therefore, an object of the present invention to provide a polystyrene resin composition greatly improved in stiffness without sacrificing the appearance and impact strength inherent in a rubber-reinforced polystyrene.

It is another object of the present invention to provide a polystyrene resin composition which is greatly improved in flame retardance as well as stiffness without sacrificing the appearance, impact strength and melt flowability of the above -mentioned polystyrene resin composition.

The foregoing and other objects, features and advantages of the present invention will be apparent from the following detailed description and appended claims.

DETAILED DESCRIPTION OF THE INVENTION

Essentially, there is provided according to the present invention, a polystyrene resin composition having improved stiffness comprising:

(a) 100 parts by weight of a rubber-reinforced polystyrene, (b) 2 to 50 parts by weight of a fibrous potassium titanate, and (c) 0.1 to 5 parts by weight of a higher fatty acid and/or its metal salt.

As the rubber-reinforced polystyrene resin, various types of so-called high impact polystyrene (HIPS) can be used. With respect to producing HIPS, a number of techniques have been developed, for which, for example, U.S. Pat. Nos. 4,185,049; 3,346,520; 2,862,906; 3,243,481 and 3,903,202 can be referred to. According to a typical method for the production of HIPS, a 3 to 15% by weight solution of a rubber material in an aromatic monovinyl monomer is subjected to bulk polymerization or suspension polymerization. The high impact polystyrenes used in the present invention generally have a weight average molecular weight of 150,000 to 400,000 as measured by gel permeation chromatography based on a calibration curve prepared using a standard polystyrene sample.

Representative examples of rubber materials include polybutadiene and a styrene-butadiene copolymer. In the rubber-reinforced polystyrene resin to be used in the present invention, the rubber material, in general, is present in an amount of 2 to 30% by weight, preferably 5 to 15% by weight, based on the weight of the rubber-reinforced polystyrene resin, and is dispersed in the matrix of the polystyrene resin as particles having an average particle diameter of 0.5 to 5 $\mu$m.

Representative examples of aromatic monovinyl monomers include styrene, $\alpha$-methylstyrene and p-methylstyrene. Of these, styrene is preferably employed. The above-mentioned aromatic monovinyl monomers may be employed individually or in combination. Other monomers which are copolymerizable with the aromatic monovinyl monomers, such as acrylonitrile, methyl methacrylate, acrylic acid and maleic anhydride, may also be employed. When other monomers copolymerizable with the aromatic monovinyl monomers are employed, the amounts thereof are generally in the range of from 1 to 15% by weight, based on the total weight of the aromatic monovinyl monomer and the monomer copolymerizable therewith. When the amount exceeds 15% by weight, some properties of the polystyrene resin composition are adversely affected. For example, when a rubber-reinforced styrene-acrylonitrile copolymer (so-called "ABS resin"), in which acrylonitrile is employed as a monomer copolymerizable with an aromatic monovinyl monomer in an amount of greater than 15% by weight, is employed, the resultant polystyrene resin composition has poor Izod impact strength.

In the present invention, the rubber-reinforced polystyrene resin may be used in combination with other thermoplastic resins, such as a styrene-butadiene block copolymer. When other thermoplastic resins are employed, the amounts thereof can be 1 to 30% by weight, based on the total weight of the rubber-reinforced polystyrene resin and the thermoplastic resin.

As the fibrous potassium titanate, there can be mentioned, for example potassium titanate whiskers having the formula:

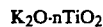

$$K_2O \cdot nTiO_2$$

wherein n is an integer of 2, 4, 6 or 8. Of these, potassium hexatitanate ($K_2O \cdot 6TiO_2$) is particularly preferred because of its chemical and physical stability. The fibrous potassium titanate can be prepared by various methods, such as a calcination method as described in Japanese Patent Application Publication Specification No. 42-27254; and a hydrothermal method, a flux method and a melt method which are described in a catalogue entitled "TISMO" published by Otsuka Chemical Co., Ltd., Japan, on Oct. 1, 1986. Of these methods, a flux method is preferred from the viewpoints of production cost, production yield, and capability of producing whiskers having a relatively large fiber length.

The fibrous potassium titanate may be one which has been surface-treated with an amino type silane coupling agent or an epoxy type silane coupling agent. Examples of such surface-treated fibrous potassium titanate include those which are available under the trade names of TISMO-D101 and TISMO-D102 (products of Otsuka Chemical Co., Ltd., Japan). TISMO-D 101 and TISMO-D 102 have a fiber diameter of 0.2–0.5 $\mu$m and an average fiber length of 10–20 $\mu$m.

The fibrous potassium titanate used in the present invention generally has an average fiber length of from 10 to 60 $\mu$m and an average fiber diameter of from 0.1 to 1.5 $\mu$m. As mentioned later, the polystyrene resin composition of the present invention may include a flame retardant. In the case where a flame retardant is not employed, it is preferred to employ a fibrous potassium titanate having an average fiber length of 10 to 30 $\mu$m and an average fiber diameter of 0.1 to 0.8 $\mu$m, while in the case where a flame retardant is employed, it is preferred to employ a fibrous potassium titanate having an average fiber length of 20 to 60 $\mu$m and an average fiber diameter of 0.5 to 1.5 $\mu$m.

Unexpectedly, the fibrous potassium titanate having larger fiber length and diameter has been found to contribute mainly to prevention of glowing upon firing. On the other hand, the fibrous potassium titanate having smaller fiber length and diameter meter is believed to contribute mainly to improvement in stiffness and appearance of the resin composition.

In the present invention, the fibrous potassium titanate is used in an amount of 2 to 50 parts by weight, preferably 10 to 50 parts by weight, more preferably 15 to 50 parts by weight, per 100 parts by weight of the rubber-reinforced polystyrene resin. If the amount of the fibrous potassium titanate is less than 2 parts by weight, no significant improvement in stiffness is exhibited, while if the amount exceeds 50 parts by weight, not only is the impact strength lowered, but also the smoothness of the surface of an ultimate shaped article is impaired.

As the higher fatty acid or metal salt thereof, a saturated fatty acid having 12 to 22 carbon atoms or a metal salt thereof is preferably used. Representative examples of higher fatty acids include lauric acid, myristic acid, palmitic acid, stearic acid, arachidic acid and behenic acid. Representative examples of metals forming the metal salt of the higher fatty acid include metals of Groups II and III of the periodic table, such as zinc, magnesium, calcium and aluminum. Accordingly, representative examples of metal salts of higher fatty acids include zinc stearate, magnesium stearate, calcium stearate, zinc palmitate, magnesium palmitate, calcium palmitate, zinc behenate, magnesium behenate, calcium behenate, zinc laurate, zinc myristate and zinc arachidate. Of these acids and metal salts, stearic acid, zinc stearate, magnesium stearate and calcium stearate are preferred. The above-mentioned higher fatty acids and metal salts thereof can be used individually or in combination.

In the present invention, generally, 0.1 to 5 parts by weight, preferably 0.3 to 3 parts by weight, of a higher fatty acid or a metal salt of a higher fatty acid are used per 100 parts by weight of the rubber-reinforced polystyrene resin. When the amount of higher fatty acid or metal salt thereof is less than 0.1 part by weight, the resultant composition has poor impact strength. On the other hand, when the amount of higher fatty acid or metal salt thereof exceeds 5 parts by weight, the resultant composition not only has poor heat resistance but also undergoes unfavorable discoloration.

In the present invention, it is necessary to incorporate a higher fatty acid or a metal salt of a higher fatty acid in the polystyrene resin composition. When other lubricants, such as ethylene-bisstearamide and the like, are used in place of the higher fatty acid or metal salt thereof, the resultant composition has poor impact strength so that the objective of the present invention cannot be attained.

When a fibrous potassium titanate is used in an amount of 15 to 50 parts by weight per 100 parts by weight of the rubber-reinforced polystyrene resin, incorporation of a flame retardant in combination with a carbon fiber into the polystyrene resin composition of the present invention is very effective for imparting excellent flame retardance to the polystyrene resin composition while maintaining the excellent stiffness and impact resistance of the composition. Without the incorporation of a carbon fiber, the effects aimed at cannot be satisfactorily obtained.

As mentioned above, when a flame retardant is employed, it is preferred to employ a fibrous potassium titanate having an average fiber length of 20 to 60 μm and an average fiber diameter of 0.5 to 1.5 μm.

The flame retardant may be an organic halogen- or phosphorus-containing flame retardant or a metal hydroxide flame retardant which is generally used for the flame retardation of a polystyrene resin.

Representative examples of organic halogen-containing flame retardants include an aromatic halogen compound, a halogenated epoxy resin, a halogenated polycarbonate resin, a halogenated aromatic vinyl polymer, a halogenated cyanurate resin, a halogenated polyphenylene ether and a halogenated polyphenylene thioether.

Of these flame retardants, an aromatic halogen compound is most preferred from the viewpoint of thermal stability.

Specifically, preferred examples of organic halogen-containing flame retardants are decabromo-diphenylene oxide, a brominated bisphenol epoxy resin, a brominated bisphenol phenoxy resin, a brominated bisphenol polycarbonate resin, a brominated polystyrene resin, a brominated cross-linked polystyrene resin, a brominated bisphenol cyanurate resin, a brominated polyphenylene oxide, polybromophenylene oxide and a decabromodiphenylene oxide bisphenol condensate (tetrabromobisphenol A monomer, its oligomer or the like).

Representative examples of organic phosphorus-containing flame retardants are phosphates containing no halogen atom, such as trimethyl phosphate, triethyl phosphate, tributyl phosphate, trioctyl phosphate, tributoxyethyl phosphate, triphenyl phosphate, tricresyl phosphate, cresyldiphenyl phosphate and octyldiphenyl phosphate; phosphates containing a halogen atom, such as tris(chloroethyl) phosphate, tris(dichloropropyl) phosphate, tris(chloropropyl) phosphate, bis(2,3-dibromopropyl)2,3-dichloropropyl phosphate, tris(2,3-dibromopropyl) phosphate and bis(chloro-propyl)-monooctyl phosphate; and phosphites, such as triphenyl phosphite.

Representative examples of metal hydroxide flame retardants include aluminum hydroxide and magnesium hydroxide.

The organic halogen- or phosphorus-containing flame retardant or a metal hydroxide flame retardant is generally used in an amount of from 4 to 35 parts by weight, preferably from 10 to 25 parts by weight, per 100 parts by weight of the polystyrene resin.

In the present invention, a flame retardant auxiliary may be incorporated in the polystyrene resin composition in order to further promote the flame retarding effect. Representative examples of flame retardant auxiliaries include molybdenum compounds, such as molybdenum trioxide and ammonium molybdate, and antimony compounds, such as antimony trioxide. Of these auxiliaries, antimony trioxide is most preferred.

The flame retardant auxiliary is generally used in an amount of from 2 to 10 parts by weight, per 100 parts by weight of the polystyrene resin.

Representative examples of carbon fibers are ones produced from polyacrylonitrile or a pitch. The diameter of the carbon fibers is generally in the range of from 5 to 20 μm. From the viewpoint of facilitating compounding into the composition, it is preferred to use a chip-like aggregate of several thousand to several tens thousand carbon fibers having a length of 6 mm or less.

The carbon fiber is generally used in an amount of from 1 to 5 parts by weight, per 100 parts by weight of the polystyrene resin. When the amount of the carbon fiber is less than 1 part by weight, the glowing time of the resultant composition is unfavorably prolonged. On the other hand, when the amount of carbon fiber is greater than 5 parts by weight, the resultant polystyrene resin composition has poor appearance, moldability and impact strength.

The flame-retardant polystyrene resin composition of the present invention is not only excellent in flame retardance, but also excellent in stiffness as well as appearance, impact strength and melt flowability. Such excellent properties are attained by a synergistic effect attributed to the use of a fibrous potassium titanate in combination with a flame retardant and a carbon fiber. The flame retardant contributes mainly to suppression of flaming and the carbon fiber contributes mainly to suppression of glowing so that a combination of a flame retardant and a carbon fiber is extremely effective with respect to flame retardation.

The polystyrene resin composition of the present invention may further contain customary additives, such as a plasticizer, a lubricant, an antistatic agent, an ultraviolet light absorber, an antioxidant, an inorganic filler and a colorant, in such an amount as will not lower the above-mentioned excellent properties of the polystyrene resin composition of the present invention.

The polystyrene resin composition of the present invention may usually be produced by melting and blending the above-mentioned components by means of a customary apparatus, such as an extruder, a kneader, a Banbury mixer and a roll mill, extruding the resultant blend, cooling the extrudate, and pelletizing. The melting and blending is generally conducted at about 170° to about 260° C. for about 15 to about 60 seconds. The extrudate is cooled to about 10° to about 50° C. and then pelletized int pellets having a length of about 3 to about 5 mm and a diameter of about 2 to about 4 mm.

The polystyrene resin composition of the present invention has not only good appearance and excellent impact strength, but also improved stiffness. Therefore, the polystyrene resin composition of the present invention can advantageously be used, after molding, as parts or housings of household electric appliances, containers, daily necessaries, and the like. Particularly, the present polystyrene resin composition is advantageously used as a material for preparing a large molded article, such as a cabinet for a large-sized TV set or a frame for an air conditioner.

Further, since the flame-retardant polystyrene resin composition of the present invention has the above-mentioned excellent properties, molded articles of small thickness having sufficient stiffness and excellent flame retardance can be produced from the polystyrene resin composition. Therefore, the present composition is advantageous from the economic viewpoint as well.

DETAILED DESCRIPTION OF THE PREFERRED EMBODIMENT

The present invention will now be described in more detail with reference to the following Examples that by no means limit the scope of the invention.

In the following Examples, Comparative Examples and Reference Examples, the properties of the styrene resin compositions were determined in accordance with the following methods.

(1) Tensile Strength at Yield Point and Tensile Elongation at Break

These were measured in accordance with ASTM D638.

(2) Flexural Strength and Flexural Modulus of Elasticity

These were measured in accordance with ASTM D790.

(3) Izod Impact Strength (notched)

The Izod impact strength at 23° C. for a notched sample was measured in accordance with ASTM D256.

(4) Vicat Softening Point

The Vicat softening point was measured in accordance with ASTM D1525 (rate of temperature increase: 2° C./min, load: 1 kg).

(5) Melt Flow Rate

The melt flow rate was measured in accordance with ISO R1133 at 200° C. (load: 5 kg).

(6) Heat Distortion Temperature

This was measured in accordance with ASTM D648.

(7) Flammability and Glowing Characteristics

The flammability and glowing characteristics were measured in accordance with the method of Vertical Burning Test for Classifying Materials 94V-0, 94V-1 or 94V-2, described in UL-Subject 94, pages 7 to 10 dated Jan. 28, 1980, published by Underwriters Laboratories Inc., U.S.A. The classification into materials 94V-0, 94V-1 and 94V-2 (hereinafter simply referred to as "V-0", "V-1" and "V-2", respectively) are conducted according to the following criteria.

(i) A material classified as V-0 shall:

A. Not have any specimens that burn with flaming combustion for more than 10 seconds after either application of the test flame.

B. Not have a total flaming combustion time exceeding 50 seconds for the 10 flame applications for each set of five specimens.

C. Not have any specimens that burn with flaming or glowing combustion up to the holding clamp.

D. Not have any specimens that drip flaming particles that ignite the dry absorbent surgical cotton located 12 inches (305 mm) below the test specimen.

E. Not have any specimens with glowing combustion that persists for more than 30 seconds after the second removal of the test flame. (ii) A material classified as V-1 shall:

A. Not have any specimens that burn with flaming combustion for more than 30 seconds after either application of the test flame.

B. Not have a total flaming combustion time exceeding 250 seconds for the 10 flame applications for each set of five specimens.

C. Not have any specimens that burn with flaming or glowing combustion up to the holding clamp.

D. Not have any specimens that drip flaming particles that ignite the dry absorbent surgical cotton located 12 inches (305 mm) below the test specimen.

E. Not have any specimens with glowing combustion that persists for more than 60 seconds after the second removal of the test flame.

(iii) A material classified as V-2 shall:

A. Not have any specimens that burn with flaming combustion for more than 30 seconds after either application of the test flame.

B. Not have a total flaming combustion time exceeding 250 seconds for the 10 flame applications for each set of five specimens.

C. Not have any specimens that burn with flaming or glowing combustion up to the holding clamp.

D. Be permitted to have specimens that drip flaming particles that ignite the dry absorbent surgical cotton placed 12 inches (305 mm) below the test specimen.

E. Not have any specimens with glowing combustion that persists for more than 60 seconds after the second removal of the test flame.

(8) Appearance of Molded article

The surface of the molded article prepared by injection molding was observed with the naked eye.

EXAMPLE 1 to 6

A rubber-reinforced polystyrene resin, a fibrous potassium titanate and a higher fatty acid or its salt were blended by means of a blender in an weight amount ratio as shown in Table 1. As the rubber-reinforce polystyrene resin, a high-impact polystyrene [Styron ®(-Dow Chemical Company, U.S.A.) H-8652, manufactured and sold by Asahi Kasei Kogy Kabushiki Kaisha, Japan] (this polystyrene is hereinafter referred to as "HIPS-1") was used as shown in Table 1. As the higher fatty acid or its metal salt, stearic acid (StAc), zinc stearate (ZnSt) and magnesium stearate (MgSt) were used as shown in Table 1. As the fibrous potassium titanate, TISMO ® D, (a product manufactured and sold by Otsuka Chemical Co., Ltc., Japan), was used.

Each of the resultant mixtures was melted and kneaded together, using a single-screw extruder having a screw diameter of 65 mm (Model HV-65-32 manufactured and sold by Tabata Industrial Machinery Co., Ltd., Japan), at 230° C. for about 15 seconds at a shrew revolution rate of 120 rpm extruded into 10 strands at an extrusion rate of 100 kg/hr, followed by cooling to 40° C. The cooled strands were pelletized to obtain pellets having a diameter of about 3 mm and a length of about 4 mm.

The properties of the thus obtained pellets were determiend according to the procedures described above. The results are shown in Table 1.

As is apparent from the data shown in Table 1, all of the polystyrene resin compositions having compositions as shown in Table 1 were excellent in stiffness and impact strength and had good appearance.

COMPARATIVE EXAMPLES 1 TO 6

Pellets of polystyrene resin compositions were prepared in substantially the same manner as in Example 1 except that the raw materials shown in Table 2 were used. In Comparative Example 1, no fibrous potassium titanate was used. In Comparative Example 2, neither a higher fatty acid nor its salt was used. In Comparative Example 3, ethylene-bisstearamide (EBS) was used instead of a higher fatty acid or its salt. In Comparative Example 4, an ABS resin (Stylac ® 101, manufactured and sold by Asahi Kasei Kogyo Kabushiki Kaisha, Japan) comprising a resin phase containing 31% by weight of acrylonitrile (the ABS resin is hereinafter referred to as "ABS-1") was used instead of HIPS-1, and neither a higher fatty acid nor its salt was used. In Comparative Example 5, an ABS resin (Stylac ® 191, manufactured and sold by Asahi Kasei Kogyo Kabushiki Kaisha, Japan) comprising a resin phase containing 30% by weight of acrylonitrile (hereinafter referred to as "ABS-2") was used instead of HIPS-1. In Comparative Example 6, a short glass fiber was used instead of a fibrous potassium titanate.

The properties of the pellets were determined according to the procedures described above. The results are shown in Table 2.

As is apparent from the data shown in Table 2, all of the polystyrene resin compositions having compositions as shown in Table 2 were poor in Izod impact strength. Further., the polystyrene resin composition in Comparative Example 1 was also poor in flexural modulus of elasticity. Moreover, the polystyrene resin composition in Comparative Example 6 gave an ultimate molded product having a poor appearance.

EXAMPLE 7

100 Parts by weight of a high-impact polystyrene [Styron ® (Dow Chemical Company, U.S.A.) H8652, manufactured and sold by Asahi kasei Kogyo K.K., Japan], 20 parts by weight of a fibrous potassium titanate having an average fiber diameter of 1.1 μm and an average fiber length of 30 μm (KISPACK, manufactured and sold by Kyushu Refractoreis Co., Ltd., Japan), 1.2 parts by weight of a carbon fiber (A-6000, manufactured and sold by Asahi Kasei Kogyo K.K., Japan. A-6000 are short fibers obtained by cutting high strength carbon fiber. The short fibers have a density of 1.78 g/cm$^3$, and elongation at break of 1.8% and a tensil modulus of $24 \times 10^3$ kg/mm$^2$), 18 parts by weight of decabromobiphenyl ether, 5 parts by weight of antimony trioxide, 4.5 parts by weight of a styrene-butadiene block copolymer (Tufprene A, manufactured and sold by Asahi Kasei Kogyo K.K., Japan) and 0.4 part by weight of zinc stearate were subjected to melt kneading at 230° C. for about 10 seconds, using a twin-screw extruder having a screw diameter of 30 mm (Model AS30 manufactured and sold by Nakatani Kikai K.K., Japan) at a screw revolution rate of 75 rpm, extruded into 3 strands at an extrusion rate of 0 kg/hr, followed by cooling with water to about 40 ° C. The cooled strands were pelletized to thereby obtain pellets of a flame retardant polystyrene resin composition. The pellets had a diameter of about 2 to about 4 mm and a length of about 3 mm to about 5 mm. From the pellets, test pieces were obtained by injection molding.

The properties of the thus obtained test pieces were determined according to the procedures described above. The results are shown in Table 3.

EXAMPLES 8 and 9

Substantially the same procedure as in Example 7 was repeated except that the amount of carbon fiber was changed to 2 parts by weight in Example 8 and 4.5 parts by weight in Example 9, to thereby obtain test pieces. The properties of the test pieces were determined and the results are shown in Table 3.

EXAMPLE 10

Substantially the same procedure as in Example 7 was repeated except that the amount of fibrous potassium titanate was changed to 30 parts by weight and the amount of carbon fiber was also changed to 4 parts by weight, to thereby obtain a test piece. The properties of the test piece were determined and the results are shown in Table 3.

EXAMPLE 11

Substantially the same procedure as in Example 7 was repeated except that the amount of fibrous potassium titanate was changed to 37 parts by weight and the amount of carbon fiber was also changed to 4 parts by weight, to thereby obtain a test piece. The properties of the test piece were determined and the results are shown in Table 3.

EXAMPLE 12

Substantially the same procedure as in Example 8 was repeated except that a high-impact polystyrene [Styron ® (Dow Chemical Company, U.S.A.) H-8117, manufactured and sold by Asahi Kasei Kogyo K.K., Japan] was used instead of Styron ® H-8652, to thereby obtain test pieces. The properties of the test pieces were determined, and the results are shown in Table 3.

EXAMPLE 13

Substantially the same procedure as in Example 12 was repeated except that the amount of fibrous potassium titanate was changed to 16 parts by weight, to thereby obtain test pieces. The properties of the test pieces were determined, and the results are shown in Table 3.

EXAMPLE 14

Substantially the same procedure as in Example 8 was repeated except that a fibrous potassium titanate having an average fiber diameter of 0.2 μm and an average fiber length of 20 μm (TISMO ® D, manufactured and sold by Otsuka Chemical Co., Ltd., Japan) was used instead of the fibrous potassium titanate having an average fiber diameter of 1.1 μm and an average fiber length of 30 μm, to thereby obtain test pieces. The properties of the test pieces were determined and the results are shown in Table 3.

REFERENCE EXAMPLE 1

Substantially the same procedure as in Example 7 was repeated except that the amount of fibrous potassium titanate was changed to 16 parts by weight and no carbon fiber was used, to thereby obtain test pieces. The properties of the test pieces were determined, and the results are shown in Table 4.

In the test of flammability, some of test pieces burnt with glowing combustion for more than 30 seconds. These are classified as V-1 level and, therefore, a V-0 level could not be attained.

REFERENCE EXAMPLE 2

Substantially the same procedure as in Example 7 was repeated except that the amount of fibrous potassium titanate was changed to 10 parts by weight, to thereby obtain test pieces. The properties of the test pieces were determined, and the results are shown in Table 4.

As is apparent from Table 4, the flexural modulus of elasticity of the composition was low, so that the practical use of the composition would not be promising.

REFERENCE EXAMPLE 3

Substantially the same procedure as in Example 8 was repeated except that the amount of fibrous potassium titanate was changed to 10 parts by weight, to thereby obtain test pieces. The properties of the test pieces were determined, and the results are shown in Table 4.

REFERENCE EXAMPLE 4

Substantially the same procedure as in Example 7 was repeated except that the amount of carbon fiber was changed to 7 parts by weight, to thereby obtain test pieces. The properties of the test pieces were determined, and the results are shown in Table 4.

As is apparent from Table 4, the impact strength and the melt flow rate of the composition were low and the appearance of the test piece was bad, so that the practical use of the composition would not be promising.

REFERENCE EXAMPLE 5

Substantially the same procedure as in Example 7 was repeated except that the amount of carbon fiber was changed to 0.5 part by weight, to thereby obtain test pieces. The properties of the test pieces were determined, and the results are shown in Table 4.

Since the carbon fiber content was low, the flammability level of the composition was V-1.

TABLE 1

| | | Example 1 | Example 2 | Example 3 | Example 4 | Example 5 | Example 6 |
|---|---|---|---|---|---|---|---|
| formu- lation | polystyrene resin (parts by weight) | HIPS-1 100 | HIPS-1 100 | HIPS-1 100 | HIPS-1 100 | HIPS-1 100 | HIPS-1 100 |
| | fibrous potassium titanate (parts by weight) | 10 | 20 | 6 | 6 | 15 | 6 |
| | higher fatty acid and/or its metal salt (parts by weight) | ZnSt 1.0 | ZnSt 1.0 | ZnSt 1.0 | MgSt 1.0 | StAc 0.5 | ZnSt 3.0 |
| proper- ties | tensile strength (kg/cm$^2$)[1] | 370 | 380 | 350 | 340 | 370 | 370 |
| | elongation (%)[2] | 29 | 25 | 35 | 34 | 27 | 36 |
| | flexural strength (kg/cm$^2$) | 630 | 620 | 600 | 580 | 600 | 600 |
| | flexural modulus of elasticity (kg/cm$^2$) | 40800 | 56400 | 34300 | 33900 | 49200 | 34500 |
| | Izod impact strength (kg · cm/cm) | 11.5 | 8.6 | 11.6 | 11.4 | 11.3 | 9.3 |
| | Vicat softening point (°C.) | 106 | 106 | 105 | 106 | 106 | 103 |
| | melt flow rate (g/10 min.) | 3.3 | 3.5 | 3.4 | 3.0 | 3.2 | 3.7 |
| | appearance of molded article | good | good | good | good | good | good |

[1] Tensile strength means "tensile strength at yield point".
[2] Elongation means "tensile elongation at break".

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| formu- lation | polystyrene resin (parts by weight) | HIPS-1 100 | HIPS-1 100 | HIPS-1 100 | (ABS-1)[1] 100 | (ABS-2)[2] 100 | HIPS-1 100 |
| | fibrous potassium titanate (parts by weight) | 0 | 10 | 6 | 11 | 25 | (glass fiber)[3] 20 |
| | higher fatty acid and/or its metal salt (parts by weight) | ZnSt 1.0 | 0 | (EBS)[4] 1.0 | 0 | ZnSt 2.5 | 0 |
| proper- ties | tensile strength (kg/cm$^2$)[5] | 370 | 380 | 360 | 545 | 450 | 750 |
| | elongation (%)[6] | 40 | 20 | 33 | 6 | 3 | 2 |
| | flexural strength (kg/cm$^2$) | 580 | 620 | 610 | 840 | 680 | 810 |
| | flexural modulus of elasticity (kg/cm$^2$) | 26600 | 41000 | 33300 | 35500 | 47000 | 52000 |
| | Izod impact strength (kg · cm/cm) | 10.1 | 5.0 | 6.7 | 2.3 | 4.3 | 3.7 |
| | Vicat softening point (°C.) | 105 | 106 | 104 | 111 | 103 | — |
| | melt flow rate (g/10 min.) | 3.1 | 3.0 | 3.0 | — | — | — |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| appearance of molded article | good | good | good | good | good | no good |

[1] An acrylonitrile-butadiene-styrene resin (ABS-1) was used instead of a rubber-reinforced polystyrene resin.
[2] An acrylonitrile-butadiene-styrene resin (ABS-2) was used instead of a rubber-reinforced polystyrene resin.
[3] A glass fiber was used instead of a fibrous potassium titanate.
[4] Ethylenebisstearamide (EBS) was used instead of a higher fatty acid and/or its metal salt.
[5] Tensile strength means "tensile strength at yield point".
[6] Elongation means "tensile elongation at break".

TABLE 3

|  |  | Example 7 | Example 8 | Example 9 | Example 10 | Example 11 | Example 12 | Example 13 | Example 14 |
|---|---|---|---|---|---|---|---|---|---|
| formulation | polystyrene resin (parts by weight) | 100 | 100 | 100 | 100 | 100 | 100 | 100 | 100 |
|  | fibrous potassium titanate (parts by weight) | 20 | 20 | 20 | 30 | 37 | 20 | 16 | 20 |
|  | carbon fiber (parts by weight) | 1.2 | 2 | 4.5 | 4 | 4 | 2 | 2 | 2 |
|  | decabromobiphenyl ether (parts by weight) | 18 | 18 | 18 | 18 | 18 | 18 | 18 | 18 |
|  | antimony trioxide (parts by weight) | 5 | 5 | 5 | 5 | 5 | 5 | 5 | 5 |
|  | Tufprene (parts by weight) | 4.5 | 4.5 | 4.5 | 4.5 | 4.5 | 4.5 | 4.5 | 4.5 |
|  | zinc stearate (parts by weight) | 0.4 | 0.4 | 0.4 | 0.4 | 0.4 | 0.4 | 0.4 | 0.4 |
| properties | Izod impact strength (kg·cm/cm) | 7.0 | 6.2 | 5.2 | 5.0 | 4.8 | 8.0 | 7.5 | 6.2 |
|  | flexural modulus of elasticity (kg/cm$^2$) | 46,000 | 48,300 | 55,800 | 54,000 | 55,000 | 45,000 | 44,000 | 49,000 |
|  | heat distortion temperature (°C.) | 82.0 | 84.5 | 87.5 | 87.5 | 88.0 | 81.5 | 82.0 | 85.0 |
|  | melt flow rate (g/10 min.) | 5.9 | 5.6 | 4.0 | 4.4 | 4.2 | 4.9 | 5.5 | 5.7 |
|  | appearance of molded article | good | good | good | good | good | good | good | good |
|  | flammability (UL-94 standard), using ⅛ inch thickness sample | V - 0 | V - 0 | V - 0 | V - 0 | V - 0 | V - 0 | V - 0 | V - 0 |
|  | average and maximum values of duration of flaming combustion after first application of test flame (seconds) | $\bar{x}$ 0.2 MAX 0.2 | $\bar{x}$ 0.2 MAX 0.2 | $\bar{x}$ 0.2 MAX 0.2 | $\bar{x}$ 0.2 MAX 0.2 | $\bar{x}$ 0.2 MAX 0.2 | $\bar{x}$ 0.2 MAX 0.2 | $\bar{x}$ 0.2 MAX 0.2 | $\bar{x}$ 0.2 MAX 0.2 |
|  | average and maximum values of duration of flaming combustion after second application of test flame (seconds) | $\bar{x}$ 0.5 MAX 0.8 | $\bar{x}$ 0.2 MAX 0.6 | $\bar{x}$ 0.3 MAX 0.6 | $\bar{x}$ 0.6 MAX 1.0 | $\bar{x}$ 0.4 MAX 0.8 | $\bar{x}$ 0.5 MAX 0.8 | $\bar{x}$ 0.3 MAX 0.6 | $\bar{x}$ 0.2 MAX 0.5 |
|  | average and maximum values of duration of glowing combustion after second removal of test flame (seconds) | $\bar{x}$ 11.0 MAX 15.0 | $\bar{x}$ 7.0 MAX 12.0 | $\bar{x}$ 5.0 MAX 11.0 | $\bar{x}$ 3.8 MAX 13.2 | $\bar{x}$ 7.8 MAX 13.7 | $\bar{x}$ 8.5 MAX 12.6 | $\bar{x}$ 8.9 MAX 13.0 | $\bar{x}$ 18.0 MAX 25.0 |
|  | dripping of flaming particles | no | no | no | no | no | no | no | no |

TABLE 4

|  |  | Reference Example 1 | Reference Example 2 | Reference Example 3 | Reference Example 4 | Reference Example 5 |
|---|---|---|---|---|---|---|
| formulation | polystyrene resin (parts by weight) | 100 | 100 | 100 | 100 | 100 |
|  | fibrous potassium titanate (parts by weight) | 16 | 10 | 10 | 20 | 20 |
|  | carbon fiber (parts by weight) | 0 | 1.2 | 2 | 7 | 0.5 |
|  | decabromobiphenyl ether (parts by weight) | 18 | 18 | 18 | 18 | 18 |
|  | antimony trioxide (parts by weight) | 5 | 5 | 5 | 5 | 5 |
|  | Tufprene (parts by weight) | 4.5 | 4.5 | 4.5 | 4.5 | 4.5 |
|  | zinc stearate (parts by weight) | 0.4 | 0.4 | 0.4 | 0.4 | 0.4 |
| properties | Izod impact strength (kg·cm/cm) | 9.0 | 7.0 | 6.1 | 2.0 | 7.0 |
|  | flexural modulus of elasticity (kg/cm$^2$) | 31,000 | 33,000 | 34,000 | 58,000 | 33,200 |
|  | heat distortion temperature (°C.) | 82.4 | 82.0 | 82.4 | 88.4 | 82.0 |
|  | melt flow rate (g/10 min.) | 6.5 | 5.5 | 5.2 | 2.0 | 6.0 |
|  | appearance of molded article | good | good | good | no good | good |
|  | flammability (UL-94 standard), using ⅛ inch thickness sample | V - 1 | V - 0 | V - 0 | V - 0 | V - 1 |
|  | average and maximum values of duration of flaming combustion after first application of test flame (seconds) | $\bar{x}$ 0.5 MAX 0.8 | $\bar{x}$ 0.2 MAX 0.2 | $\bar{x}$ 0.2 MAX 0.2 | $\bar{x}$ 0.2 MAX 0.2 | $\bar{x}$ 0.2 MAX 0.2 |
|  | average and maximum values of duration of flaming combus- | $\bar{x}$ 0.5 MAX 0.8 | $\bar{x}$ 0.2 MAX 0.4 | $\bar{x}$ 0.3 MAX 0.5 | $\bar{x}$ 0.2 MAX 0.3 | $\bar{x}$ 0.4 MAX 0.5 |

TABLE 4-continued

|  | Reference Example 1 | Reference Example 2 | Reference Example 3 | Reference Example 4 | Reference Example 5 |
|---|---|---|---|---|---|
| tion after second application of test flame (seconds) |  |  |  |  |  |
| average and maximum values of duration of glowing combustion after second removal of test flame (seconds) | $\bar{x}$ 23.0 MAX 45.0 | $\bar{x}$ 10.0 MAX 20.0 | $\bar{x}$ 6.5 MAX 15.0 | $\bar{x}$ 2.5 MAX 5.0 | $\bar{x}$ 20.0 MAX 35.0 |
| dripping of flaming particles | no | no | no | no | no |

What is claimed is:

1. A polystyrene resin composition having improved stiffness comprising:
   (a) 100 parts by weight of a composition comprising a polystyrene resin having dispersed therein 2 to 30% by weight of a rubber material, said rubber material being dispersed in said polystyrene resin as particles having an average particle diameter of 0.5 to 5 μm,
   (b) 2 to 50 parts by weight of a fibrous potassium titanate, and
   (c) 0.1 to 5 parts by weight of a higher fatty acid and/or its metal salt.

2. The polystyrene resin composition according to claim 1, wherein said fibrous potassium titanate has an average fiber length of from 10 to 60 μm and an average fiber diameter of from 0.1 to 1.5 μm.

3. The polystyrene resin composition according to claim 2, wherein the fibrous potassium titanate has an average fiber length of from 10 to 30 μm and an average fiber diameter of from 0.1 to 0.8 μm.

4. The polystyrene resin composition according to claim 1, wherein the amount of the fibrous potassium titanate is from 10 to 50 parts by weight.

5. The polystyrene resin composition according to claim 4, wherein the amount of the fibrous potassium titanate is from 15 to 50 parts by weight.

6. The polystyrene resin composition according to claim 5, including (d) 4 to 35 parts by weight of a fire retardant and (e) 1 to 5 parts by weight of a carbon fiber.

7. The polystyrene resin composition according to claim 6, wherein the fibrous potassium titanate has an average fiber length of from 20 to 60 μm and an average fiber diameter of from 0.5 to 1.5 μm.

8. The polystyrene resin composition according to claim 1, 2, 3, 4, 5, 6, or 7, wherein said higher fatty acid is a saturated fatty acid having 12 to 22 carbon atoms and said metal is selected from the group consisting of metals of Groups II and III of the periodic table.

9. A polystyrene resin composition having improved stiffness consisting of:
   (a) 100 parts by weight of a composition comprising a polystyrene resin having dispersed therein 2 to 30% by weight of a rubber material, said rubber material being dispersed in said polystyrene resin as particles having an average particle diameter of 0.5 to 5 μm,
   (b) 2 to 50 parts by weight of a fibrous potassium titanate,
   (c) 0.1 to 5 parts by weight of at least one of a higher fatty acid and its metal salt,
   (d) 0 to 35 parts by weight of a fire retardant, and
   (e) 0 to 5 pats by weight of a carbon fiber.

10. The polystyrene resin composition according to claim 9, wherein the amount of said fire retardant is 4 to 35 parts by weight and the amount of said carbon fiber is 1 to 5 parts by weight.

11. The polystyrene resin composition according to claim 9, wherein said fibrous potassium titanate has an average fiber length of from 10 to 60 μm and an average fiber diameter of from 0.1 to 1.5 μm.

12. The polystyrene resin composition according to claim 11, wherein the fibrous potassium titanate has an average fiber length of from 10 to 30 μm and an average fiber diameter of from 0.1 to 0.8 μm.

13. The polystyrene resin composition according to claim 9, wherein the amount of the fibrous potassium titanate is from 10 to 50 parts by weight.

14. The polystyrene resin composition according to claim 13, wherein the amount of the fibrous potassium titanate is from 15 to 50 parts by weight.

15. The polystyrene resin composition according to claim 13, wherein the fibrous potassium titanate has an average fiber length of from 20 to 60 μm and an average fiber diameter of from 0.5 to 1.5 μm.

16. The polystyrene resin composition according to claim 9, wherein said higher fatty acid is a saturated fatty acid having 12 to 22 carbon atoms and said metal is selected form the group consisting of metals of Groups II and III of the periodic table.

17. A polystyrene resin composition having improved stiffness consisting of:
   (a) 100 parts by weight of a composition comprising a polystyrene resin having dispersed therein 2 to 30% by weight of a rubber material, said rubber material being dispersed in said polystyrene resin as particles having an average particle diameter of 0.5 to 5 μm,
   (b) 2 to 50 parts by weight of a fibrous potassium titanate having an average fiber length of from 10 to 60 μm and an average fiber diameter of from 0.1 to 1.5 μm,
   (c) 0.1 to 5 parts by weight of at least one of a saturated fatty acid having 12 to 22 carbon atoms and its metal salt, said metal being selected from the group consisting of metals of Groups II and III of the periodic table,
   (d) 4 to 35 parts by weight of a fire retardant, and
   (e) 1 to 5 parts by weight of a carbon fiber.

* * * * *